(12) United States Patent
Bristow et al.

(10) Patent No.: US 7,255,391 B2
(45) Date of Patent: Aug. 14, 2007

(54) TWIN-SHEET THERMOFORMED PRODUCTS

(75) Inventors: Paul A. Bristow, Brighton, MI (US); Jesse G. Hipwell, Columbiaville, MI (US); Richard D. Hemstreet, Warren, MI (US)

(73) Assignee: Azdel, Inc., Forest, VA (US)

( * ) Notice: Subject to any disclaimer, the term of this patent is extended or adjusted under 35 U.S.C. 154(b) by 226 days.

(21) Appl. No.: 10/981,338

(22) Filed: Nov. 4, 2004

(65) Prior Publication Data
US 2005/0082881 A1 Apr. 21, 2005

Related U.S. Application Data

(62) Division of application No. 10/800,505, filed on Mar. 15, 2004, now Pat. No. 7,157,034.

(60) Provisional application No. 60/460,556, filed on Apr. 3, 2003.

(51) Int. Cl.
*B60R 13/02* (2006.01)
(52) U.S. Cl. ..................... 296/214; 296/39.1
(58) Field of Classification Search ............ 296/214, 296/39.1; 428/160, 304.4, 423.3
See application file for complete search history.

(56) References Cited

U.S. PATENT DOCUMENTS

| 4,741,945 A | * | 5/1988 | Brant et al. | |
|---|---|---|---|---|
| 6,120,090 A | * | 9/2000 | Van Ert et al. | 296/211 |
| 6,652,021 B1 | * | 11/2003 | Dykman et al. | 296/214 |

* cited by examiner

*Primary Examiner*—Stephen Gordon
(74) *Attorney, Agent, or Firm*—Clements Walker; Jason S. Miller (57) ABSTRACT

A twin-sheet thermoforming process for the manufacture of vehicle headliners. In the process a first sheet and second sheet of SuperLite material are mounted onto respective frames. The frames transfer the sheets into an oven, where they are heated to a desired temperature using IR. The first sheet is combined with a cover-stock material using compression molding forming a covered first headliner part. The covered first headliner part is then transferred to a second mold station. The second sheet is heated and then transferred from the oven to the second mold station where it is vacuum-formed on the upper half mold, forming a second headliner part. The upper and lower mold halves are pressed together fusing and sealing the first and second headliner parts into a unified part. The unified part is then unloaded and trimmed as necessary forming a headliner. The SuperLite material used to form the headliner is a sheet of low pressure, thermoformable, thermoplastic composite comprised of polypropylene and long chopped glass fibers.

12 Claims, 6 Drawing Sheets

TWIN-SHEET THERMOFORMED PRODUCTS

CROSS REFERENCE TO RELATED APPLICATION

The application is a Division of U.S. patent application Ser. 10/800,505, filed on Mar. 15, 2004, that has now issued as U.S. Pat. No. 7,157,034 on Jan. 2, 2007; and the application claims the benefit thereof of the earlier filing date. This application also claims the benefit of the priority filing date of the provisional patent application filed Apr. 3, 2003, bearing Ser. No. 60/460,556.

FIELD OF THE INVENTION

The present invention relates to a method and apparatus for making twin-sheet thermoformed material and, more particularly to a process for making twin-sheet thermoformed material for use as vehicle headliners, wherein the head liner imparts improved head impact protection and sound proofing to the vehicle.

BACKGROUND OF THE INVENTION

Traditionally, product made from a twin-sheet thermoforming process, with respect to the interior of a vehicle, has been used in applications such as rear parcel shelves, door panels, pillar trim, and load-floors. Such a process has not been used for the manufacture of vehicle headliners.

Currently, most vehicle headliners include extra Head Impact Countermeasures (HIC), such as PU foam blocks, attached in strategic positions on the back of a headliner substrate. These HIC parts are expensive and necessitate a secondary operation to affix these parts. These parts are usually made from materials such as Polyurethane, Expanded Polypropylene, Polypropylene, Polyethylene, Polystyrene, and others.

What is needed is for a twin-sheet thermoform process for the manufacture of vehicle headliners. Also needed is for the process to obviate the need for HIC parts by molding the proper geometry into the headliner substrate itself. Moreover, it is desired that the process introduces fabric into the vehicle headliner, thereby obviating the need for adhesively adhering the fabric to the headliner. Further needed is for the headliner to have beneficial acoustic properties.

SUMMARY OF INVENTION

The invention a headliner for a vehicle and a method for making the same, wherein the headliner has improved Head Impact Countermeasures (HIC) properties, acoustic properties and cost of manufacture. The headliner is comprised of a first headliner part and a second headliner part. The first headliner part is a first sheet having a liner side and an opposing side, wherein the first sheet is molded into a shape that is substantially the shape that is visible as seen from inside of the vehicle. The second headliner part is a second sheet having a roof side and a compartment side, wherein the second sheet is molded to reinforce the first headliner part, attach the headliner to the roof, form at least one interior compartment that cushions impact when combined with the first headliner part, and form an intra-panel space between the roof and the second first headliner part. The first headliner part and the second headliner part are adhered to each other forming a unified part having compartments. The interior compartments provide excellent head impact countermeasures (HIC) properties, as the sheets comprising headliner parts have a composition with sufficient flex to give when impacted. The interior compartments act to cushion a blow if an incident occurs wherein someone impacts the headliner. The second headliner part shape furthermore creates at least another intra-panel space between the second headliner part and the roof. The intra-panel space produces sound dampening, particularly from noise emanating from the roof. The intra-panel space also provides an additional region for absorbing impact. A preferred composition for the headliner is a thermoplastic composite that can be vacuum thermoformed. Typically, the composition of both headliner parts is a low pressure, thermoformable, thermoplastic composite comprised of polypropylene and long chopped glass fibers. The headliner is preferably further comprised a cover-stock material, such as a fabric, a film, a felt, or a skin such as a fur or a leather. It is anticipated that as other cover-stock materials can be employed. Examples of less popular potential cover-stock materials include foams, knits, carpets, rubber padding, and coatings. Depending on the method of manufacture and the nature of the cover stock material, the cover-stock material can be adhered directly to the thermoplastic composite, or adhered with an adhesive. Normally, an intra-layer adhesive is employed, which bonds the thermoplastic composite first sheet to the cover-stock material forming a covered first headliner part. The cover-stock material is typically pre-coated with an adhesive using a web converting process, wherein a heat activated adhesive is coated onto the cover-stock material. The thermoplastic composite is then laminated to the cover-stock material using matched mold compression thermoforming. Alternatively, a filmic adhesive can be employed to produce the covered first headliner part. The cover-stock material can also have an underlying layer of foam, which acts principally to impart a tactile softness to the cover-stock material. The first headliner part can additionally have a fusing adhesive on the opposing side of the first headliner part. The adhesive enhances the bond between the first and second headliner parts. The roof side of the second headliner part can have a reinforcing scrim layer, such as a nonwoven or woven polyester or glass fiber forming a reinforced scrim second headliner part. The second headliner part can additionally have a fusing adhesive on the compartment side of the second headliner part. The adhesive enhances the bond between the first and second headliner part. The thickness, density and composition of the first and second headliner parts are selected to provide impact cushioning. The thickness range is from about 2 mm to about 10 mm. The glass content is about 35% to 65%, with a more preferred composition of 40% to 57% by weight. The coefficient of thermal expansion (CTE) is from about $12 \times 10^{-6}$ mm/mm/° C. to about $19 \times 10^{-6}$ mm/mm/° C. over a temperature range of $-40°$ C. to $+70°$ C. The trend correlates that the higher the density, the higher the CTE. Prior to combining the first headliner part to the second headliner part, the vacuum formed headliner parts can be fitted with additional components such as duct work, wiring, electronic devices, conduits, reinforcing layers and fastening elements, etc. The additional components can be secured using vibration, ultrasonic and hot plate welding.

The process for forming a headliner is comprised of the steps of: placing a first sheet in a first frame, which tensions the sheet on at least two sides and preferably four, and transferring the first sheet into an oven; heating the first sheet in the oven to a predetermined temperature; transferring and vacuum molding the first sheet onto a half mold of a thermoforming mold forming a first headliner part; placing a second sheet in a second frame and transferring the second sheet into the oven or, if available, an alternate oven; heating the second sheet in the oven to a predetermined temperature; transferring and vacuum molding the second sheet onto an opposing half mold of the thermoforming mold forming a first headliner part; compressing the half molds of the thermoforming mold fusing the headliner part to the second headliner part, thereby forming a unified part having at least one interior compartment having impact cushioning; ejecting the unified part; and trimming and finishing the unified part. The first and second sheets are positioned in the thermoforming press such that, for sheets having a fusing adhesive, the fusing adhesives are face-to-face, and the fusing adhesive is not in contact with either the half mold. The process reduces the number of steps from forming two traditionally compression molded sheets and then uniting these sheets to a single two step vacuum molding process, which produces the sheets and then in the same mold combining the sheets into a unified part. The process can be amended to further comprise thermoforming the first sheet to have the cover-stock material forming a covered first headliner part. After heating the first sheet in the oven to the predetermined temperature, the first sheet is transferred to a thermoforming mold having matched mold halves, and a cover-stock material is transferred to the thermoforming mold and the mold is compressed thereby fusing the cover-stock material to the first sheet forming a covered first headliner part. The process enables inline preparation of the headliner with a desired cover-stock, thereby forming a covered unified part. The cover-stock material can comprise an underlying layer of foam and an intra-layer adhesive. The process can additionally include adding a reinforcing scrim to the second sheet using compression molding therein forming a reinforced scrim second headliner part. After heating the second sheet in the oven to the predetermined temperature, transferring the heated second sheet to a thermoforming mold having matched mold halves, there is transferred a reinforcing scrim material to the thermoforming mold having matched mold halves. The mold is closed compressing and fusing the reinforcing scrim material to the second sheet forming a scrim reinforced second headliner part. The scrim reinforced second headliner part is then transferred onto the opposing half mold of the vacuum thermoforming mold. The thermoforming mold compresses the half molds, which adheres the layer of fusing adhesive on the covered first headliner part to the layer of fusing adhesive on the reinforced scrim second headliner part, thereby forming a covered reinforced scrim unified part. The covered reinforced scrim unified part is a headliner having high impact cushioning and an esthetically appealing cover-stock.

In subsequent trimming and finishing steps the unified part has the selvage removed, and the interior compartments can be modified by injecting foam and insulation into the compartment.

OBJECTS OF THE INVENTION

The principal object of the present invention is to provide a twin-sheet thermoform process that produces a unified part, and in particular a vehicle headliner.

A second object of the invention is to provide a process for forming a headliner having impact cushioning.

A third object of the invention is to provide a twin-sheet thermoform process that includes the introduction of a fabric into a formed vehicle headliner.

A fourth object of the invention is to provide a process for forming a headliner having sound dampen qualities.

A fifth object of the invention is to provide a twin-sheet thermoform process that obviates the need for PU foam blocks in a vehicle headliner.

A sixth object of the invention is to provide a hollow vehicle headliner using low-density glass-filled materials with a thermoplastic resin matrix.

A seventh object to of the invention is to provide a twin-sheet thermoform process that lends itself to integrating components such as duct work, wiring, electronic devices, conduits, reinforcing layers and fastening elements, etc. into the headliner. The additional components can be secured using vibration, ultrasonic and hot plate welding or conventional fastening means.

A final object of the invention is to provide a twin-sheet thermoform process which reduces the cost associated with vehicle headliners formed by traditional processes.

BRIEF DESCRIPTION OF THE DRAWINGS

The foregoing and other objects will become more readily apparent by referring to the following detailed description and the appended drawings.

DETAILED DESCRIPTION

As described herein and illustrated by the drawings, the present invention is a two-sheet thermoform process for producing a thermoformed product. In particular, the invented process is particularly useful in producing vehicle headliners. Further, the process allows for a headliner to be formed with a fabric and formed into a desired shape. As such, this process resolves concerns such as adhesion of fabric to the headliner, while preserving acoustic properties.

In general the invented two sheet process includes the steps of placing a first sheet of material, such as SuperLite, into a frame, then heating the material in a preheat oven. SuperLite® is a product of Azdel, Inc. SuperLite is thermoplastic composite that can be vacuum thermoformed. The composition of both sheets is a low pressure, thermoformable, thermoplastic composite comprised of polypropylene and long chopped glass fibers. The sheets have a flexural modulus between 900 and 1800 MPa (ASTM D792), and a multi-axial impact between 5 and 7 J (ASTM D3763). The thickness of the sheets is 2 to 5 mm, with 2.5 to 3.5 mm being more preferable. The headliner is preferably further comprised a cover-stock material, such as a fabric, a film, a felt, or a leather. The molded sheets are headliner parts that are assembled so as to form interior compartments, which provide cushioning against impact. When mounted to the roof of the vehicle, there is an intra panel space between the roof and the headliner. The intra panel space provides additional other impact cushioning, as the headliner is composed of materials that are designed to flex, therein providing extra Head Impact Countermeasures (HIC). The compartments and the intrapanel space also provide sound isolation, particularly from noise emanating from the roof.

Figure 1:
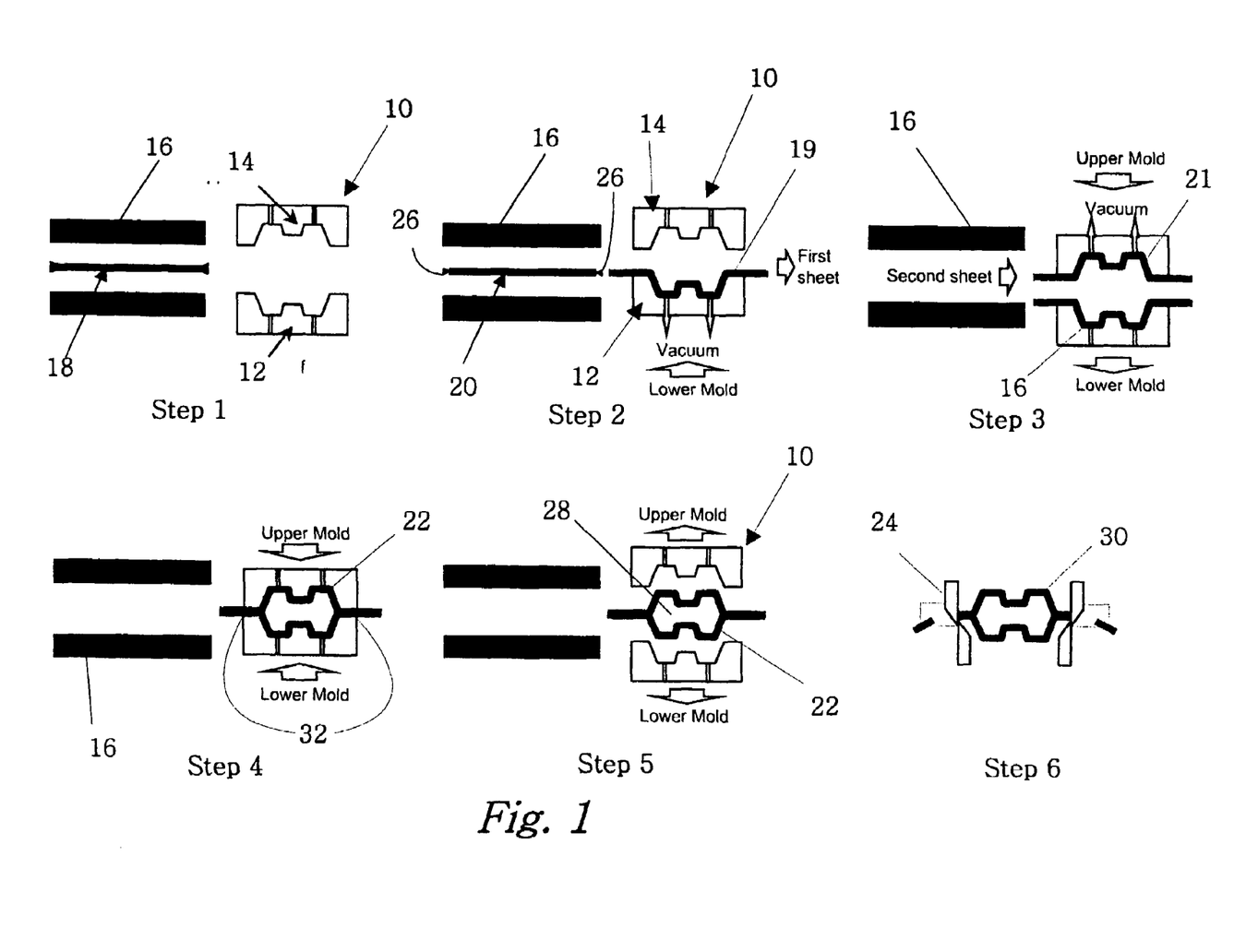
FIG. 1 is a schematic drawing illustrating the process of forming a headliner using a single mold to vacuum form a first and second sheet of a thermoplastic composite, and then to unify the two molded sheets.

Referring now to the figures, FIG. 1 is a schematic drawing illustrating the process for forming the headliner using a single thermoforming mold 10 to vacuum form a first and second sheet of a thermoplastic composite, and then to unify the two molded sheets. A first sheet 18 is placed in a frame 26 and then moved into an oven 16. The oven is either an IR, air impingement, hot air, RF or a combination thereof. The IR ovens offer the advantage of requiring little floor space, no ventilation, and profiling the heat intensity. Generally electric IR is preferred to gas IR as no exhaust gas ventilation is required. A medium wavelength infra-red (2-4 microns) is commonly employed. Heating time is about 40-60 seconds, which is sufficient to warm the sheet to about 180° C. to 225° C. The sheet material employed in a typical headliner is 2.5 mm thick, and has a weight from about 750 to about 950 GSM. When the first sheet reaches the desired temperature it is transferred into the mold as shown in Step 2 of FIG. 1 where it is vacuum formed on the lower half mold 12 forming a first headliner part, and the second sheet, loaded on a second frame 26, is transferred into the oven 16. In Step 3, the heated second sheet 20 is transfer into the mold 10, where it is vacuum formed on the upper half mold 14, forming a first headliner part. In Step 4, the mold 10 is closed in the compression mode. The upper and lower half molds have matching surfaces, which regionally cause the first and the second headliner parts to be compressed against each other, therein fusing regions of the two headliner parts forming a unified part 22. The unified part has at least one interior compartment 28, which provides impact cushioning. In Step 5, the mold is opened and the unified part 22 is ejected, and transferred to the trimming and finishing station. In Step 6, the selvage is removed and finishing steps are completed, such as welding, attachment of fastening elements, or modification of the interior compartment is completed. For instance a modification of the compartment would be to fill it with foam.

Figure 2:
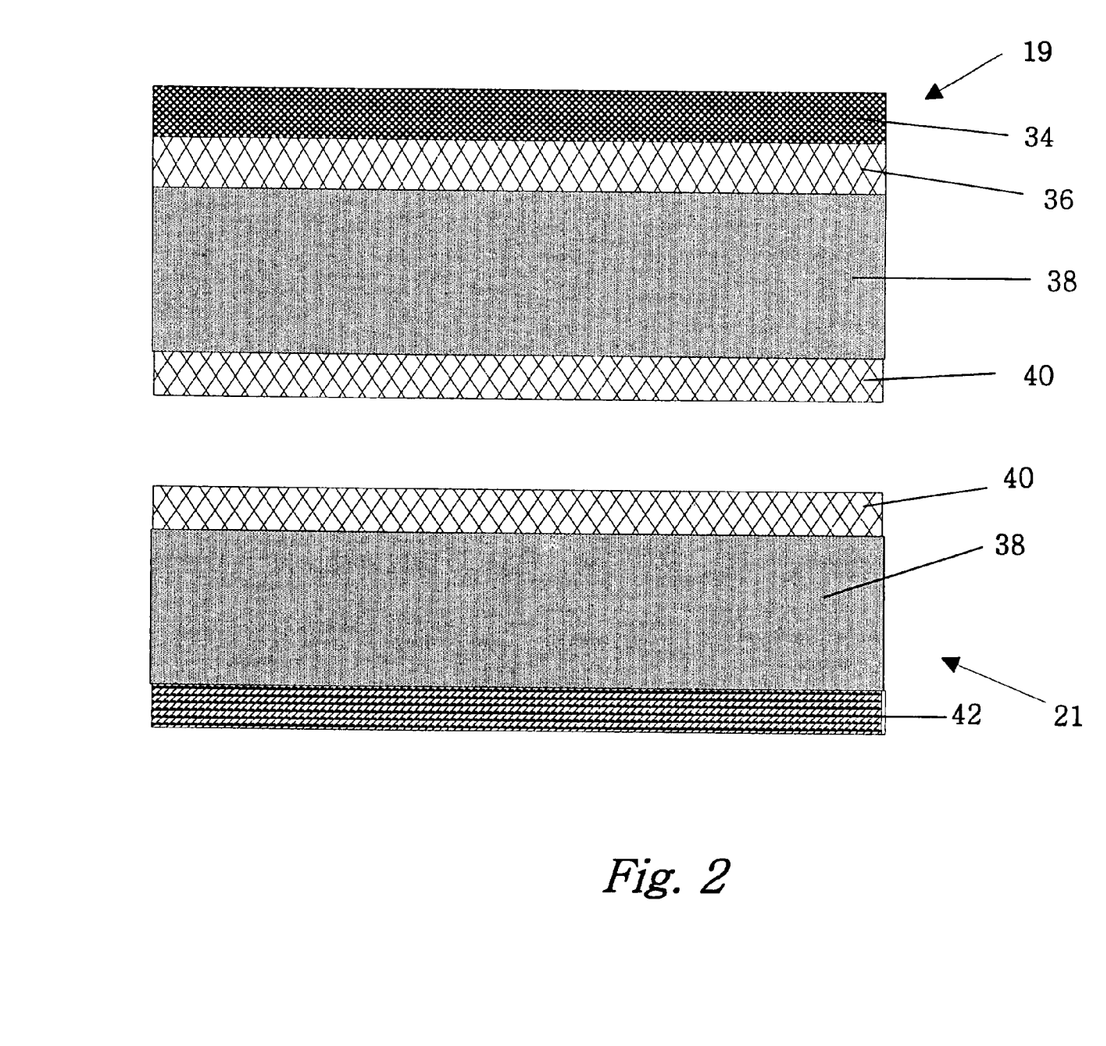
FIG. 2 is a cross sectional view of a first headliner part 19 having a cover-stock 34 and a second headliner part backed with a reinforcing scrim 42.

Referring to FIG. 2, which is a cross sectional view of the first headliner part 19 having a cover-stock 34 and the second sheet backed with a reinforcing scrim 42. From the top down, the first headliner part 19 has a cover-stock materials 34, an intra-layer adhesive 36, a low pressure thermoformable, thermoplastic composite comprised of polypropylene and long chopped glass fibers 38, and a fusing adhesive 40. The second headliner part 21, has a fusing adhesive 40, a low pressure thermoformable, thermoplastic composite comprised of polypropylene and long chopped glass fibers 38, and a polyester scrim 42. The sheets have a flexural modulus between 900 and 1800 MPa (ASTM D792), and a multi-axial impact between 5 and 7 J (ASTM D3763). The thickness of the sheets is 2 to 5 mm, with 2.5 to 3.5 mm being more preferable. The cover-stock material is a fabric, a film, a felt, or a leather 34.

Figure 3:
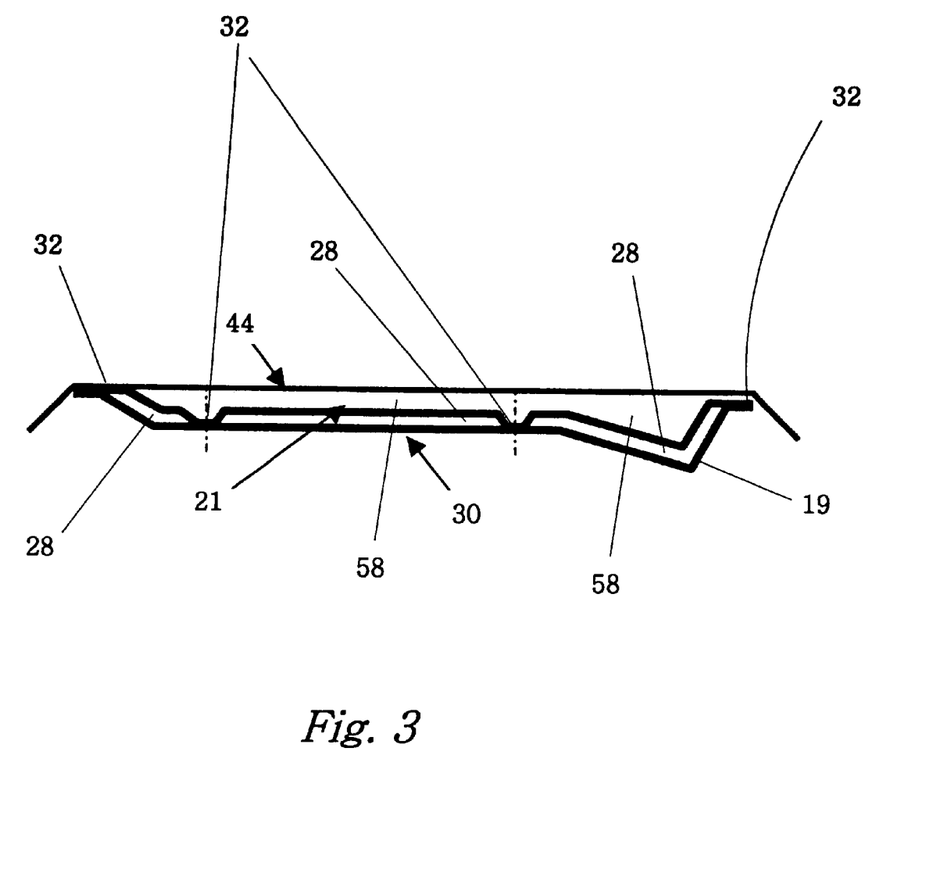
FIG. 3 is a cross-sectional view of a unified part, a headliner 30, as shown relative to the roof of a vehicle.

FIG. 3 is a cross-sectional view of the headliner 30, as shown relative to the roof 44 of a vehicle. The first and second headliner parts are adhered at four points, each numbered 32. There are three interior compartments, each numbered 28. There is an intrapanel space 58 created between the roof 44 and the headliner 30. The interior compartments 28 provide impact cushioning. The intra panel space 58 provides noise suppression. The cover-stock material 34 on the first headliner part 19 faces the interior of the vehicle. The cover-stock material can additionally have an underlying layer of foam to improve the tactile feel of the cover-stock material.

Figure 4:
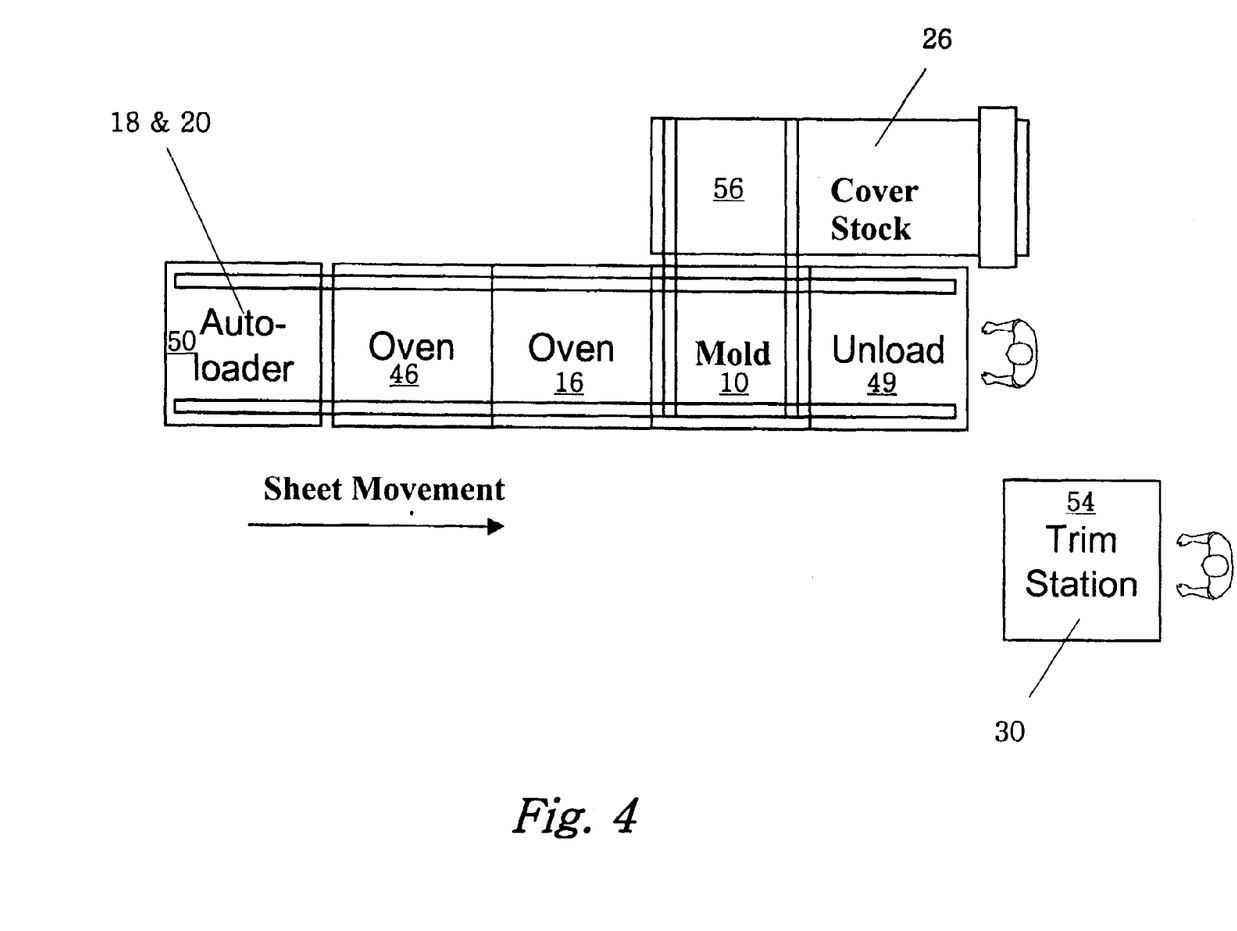
FIG. 4 is a two-stage oven inline process schematic for making a headliner having a cover-stock material.

The lamination of the cover stock material to the first sheet can be incorporated into the manufacture of the headliner. FIG. 4 a two-stage oven inline process schematic for making a headliner having a cover-stock material. In the process the first sheet 18 is fed by an automatic loader 50 into a two-stage oven, where the first stage is a preheater 46 and the second stage is higher temperature oven 16. The ovens act also as a holding station for the sheets to be warmed while they are being prepared for molding. A frame transfers the first sheet to the preheater 46 and then to the oven 16, where it is warmed to the temperature needed for molding. Upon reaching the desired temperature the warmed first sheet 18 and the cover-stock material 26 on a frame 56 are transferred into a thermoforming mold 10, where the mold 10 is fitted with matched mold halves. The cover-stock is compression molded to the first sheet forming a covered first headliner part. The covered first headliner part is ejected, and the process is repeated until a sufficient quantity of covered first headliner parts have been produced. Similarly, the second sheet can be compression molded to a reinforcing scrim using the cover stock frame 56. The matched halves are removed, and the mold 10 is set up for vacuum molding. The first headliner parts are then processed back through the line using vacuum forming, as required. From the auto-loader 50, the covered first headliner part and then the second sheet are fed into the preheater 46 and then the oven 16. The covered first headliner part 19 is positioned on the lower half mold 12, and the second sheet 20 is vacuum formed on the upper half mold 14 forming the second headliner part 21, respectively. The headliner parts are then compression molded, wherein matching surfaces regionally cause the first and the second headliner parts to be compressed against each other, fusing and sealing the regions of compression. The compression unifies the two into a single part 22. The unified part 22 is ejected to the unload station and transferred to the trim station 54, where selvage and other finishing operations are performed. In a variation in process using the same equipment, after the first sheet is compression molded with the cover sheet forming the covered headliner part, the top matched half mold can be removed, and the second sheet can be vacuum molded in the top half mold 14. The two sheets can then be fused and sealed using compression molding. The addition of the cover-stock material is optional, and the process can be employed using sheets that either do not have a cover-stock material, or are pre-laminated with the liner cover stock. Of course, this also true for the reinforcing scrim.

Figure 5:
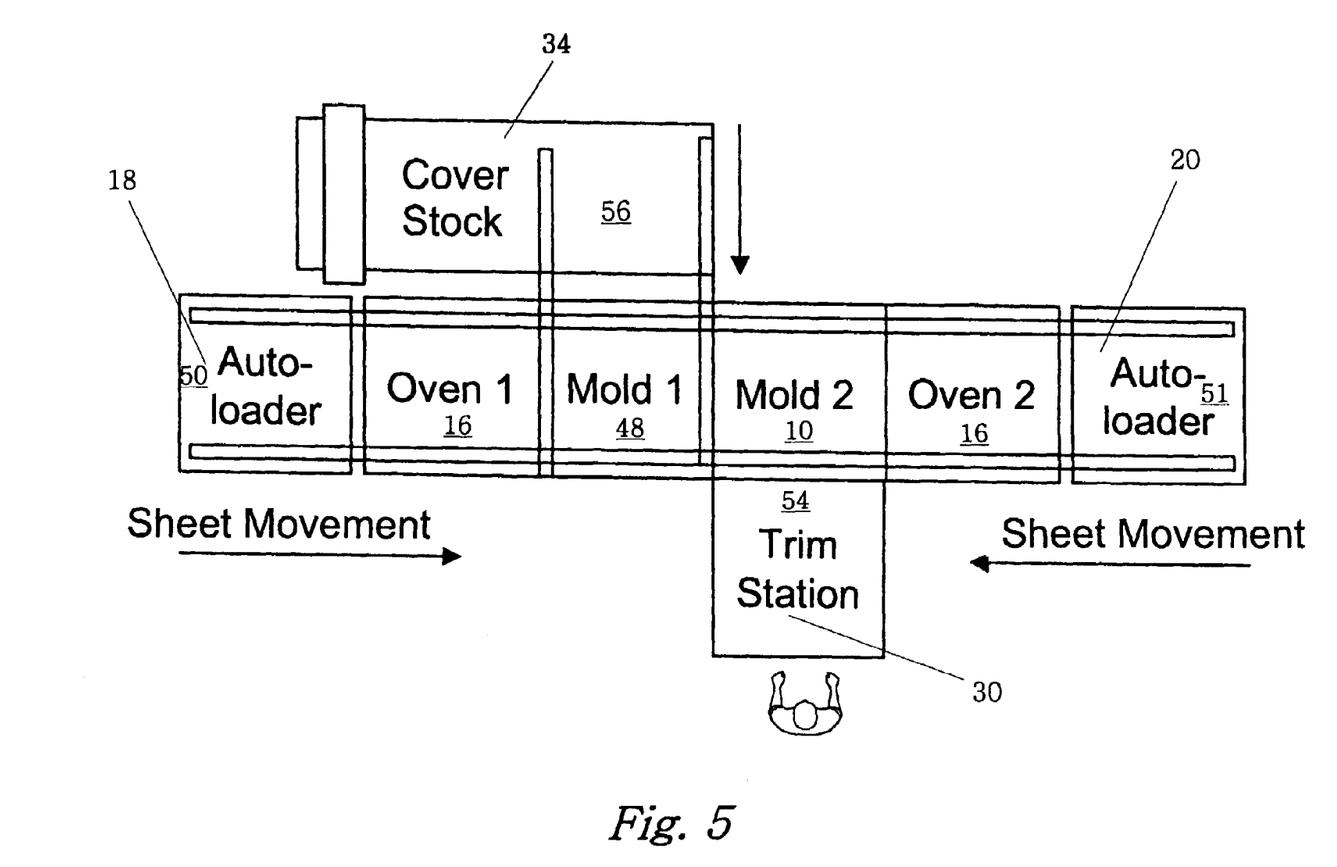
FIG. 5 is a double oven double thermoforming molding inline process schematic for making a headliner having a cover-stock material.

FIG. 5 depicts a double oven double thermoforming molding inline process schematic for a headliner having a cover-stock material. In the this process the first mold 48 is fitted with matched halves and is operated to compression mold the cover-stock 34 to the first sheet 18. The covered first sheet is then transferred to the second mold 10, where it is positioned in the lower half mold 12. The second sheet 20 is vacuum molded to the top half mold 14, and the two sheets are compression molded into the unified part 22. The unified part 22 is ejected to the trim station 54, where the selvage is removed and finishing is completed forming a headliner 30. The inline process is particularly productive as it has two molds, 48 and 10, and two auto-loaders, 50 and 51.

Figure 6:
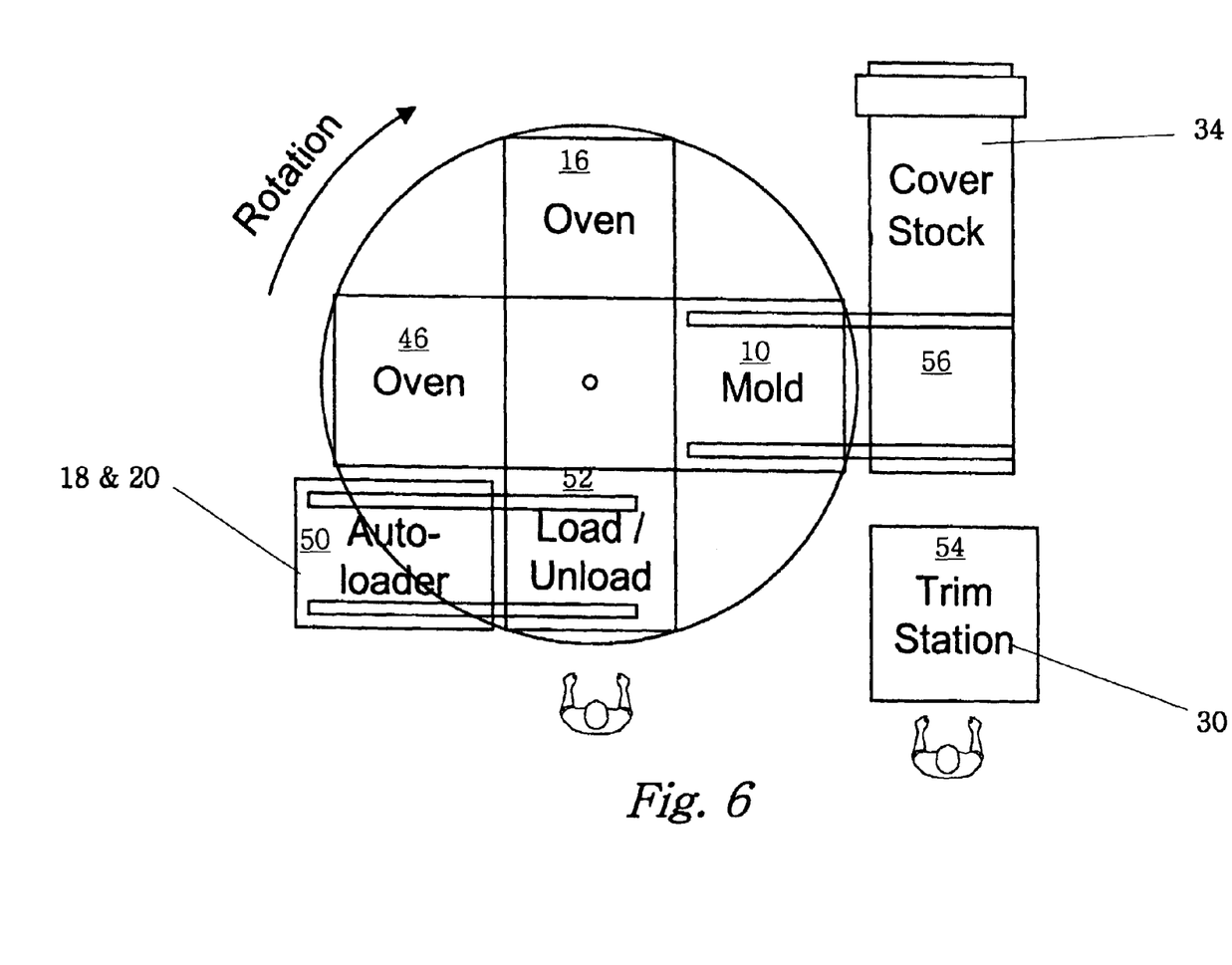
FIG. 6 is a two-stage oven rotary process schematic for making a headliner having a cover-stock material.

FIG. 6 is a two-stage oven rotary process schematic for making a headliner having a cover-stock material. The rotary process is essentially the same as described for the inline process depicted in FIG. 5.

The drawings illustrate alternative thermoform process configurations for accomplishing the manufacture of twin-sheet thermoform headliner. For example, the process steps may be set-up in a linear or rotary arrangement.

SUMMARY OF THE ACHIEVEMENT OF THE OBJECTS OF THE INVENTION

From the foregoing, it is readily apparent that we have invented an improved process for the manufacture of thermoformed material and, in particular, for the manufacture of vehicle headliners. It is also apparent that we have invented an improved vehicle headliner that is formed by the invented process. The headliner has improved impact cushioning, improved acoustic qualities, lower cost. The process enables quick changeovers from one headline cover-stock material to another, and provides a mechanism of integrating components such as duct work, wiring, electronic devices, conduits, reinforcing layers and fastening elements, etc. into the headliner.

It is to be understood that the foregoing description and specific embodiments are merely illustrative of the best mode of the invention and the principles thereof, and that various modifications and additions may be made to the apparatus by those skilled in the art, without departing from the spirit and scope of this invention.

What is claimed is:

1. A headliner for a vehicle having excellent head impact countermeasures (HIC) properties, said headliner comprising:
    a first headliner part having a liner side and an opposing side, wherein the first headliner part has a molded shape that is substantially the visible form for the headliner as seen inside the vehicle;
    a second headliner part having a roof side and a compartment side, wherein the second headliner part is molded to reinforce the first headliner part, attach the headliner to a roof of the vehicle, form at least one interior compartment with flexible walls when combined with the first headliner part, and form an intra-panel space between the roof and the second headliner part;
    wherein the opposing side of the first headliner part and the compartment side of the second headliner part are adhered to each other, therein forming the at least one interior compartment that has excellent head impact countermeasures (HIC) properties;
    wherein the intra-panel space produces sound dampening; and
    wherein the first headliner part and the second headliner part are sheets of a low pressure, thermoformable, thermoplastic composite comprised of polypropylene and long chopped glass fibers.

2. The headliner as claimed in claim 1, wherein the first headliner part has a flexural modulus between 900 and 1800 MPa (ASTM D792), and a multi-axial impact between 5 and 7 J (ASTM D3763).

3. The headliner as claimed in claim 2, wherein the second headliner part has a flexural modulus between 900 and 1800 MPa (ASTM D792), and a multi-axial impact between 5 and 7 J (ASTM D3763).

4. A headliner according to claim 1, wherein the first headliner part further comprises a cover-stock material fused to the liner side.

5. The headliner as claimed in claim 4, wherein the cover stock material is comprised of a fabric, a film, a felt, or a skin.

6. The headliner as claimed in claim 5, wherein between the cover stock material and the first headliner part is an intra-layer adhesive.

7. The headliner as claimed in claim 5, wherein the cover stock material has sound dampening properties.

8. The headliner as claimed in claim 4, wherein the cover stock material is further comprised of an underlying layer of foam.

9. A headliner according to claim 1, wherein the second headliner part further comprises a reinforcing scrim material that is bonded to the roof side of the second headliner part.

10. A headliner according to claim 1, wherein the second headliner part is further comprised of a layer of a fusing adhesive on the compartment side of the second headliner part.

11. A headliner according to claim 10, wherein the first headliner part is further comprised of a layer of a fusing adhesive on the opposing side of the first headliner part.

12. The headliner according to claim 11, wherein the layer of fusing adhesive on the compartment side of the second headliner part is fused with the layer of fusing adhesive on the opposing side of the first headliner part.

* * * * *